Figure 3:
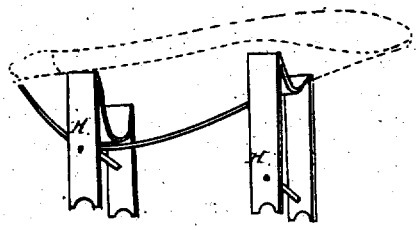
Figure 1:
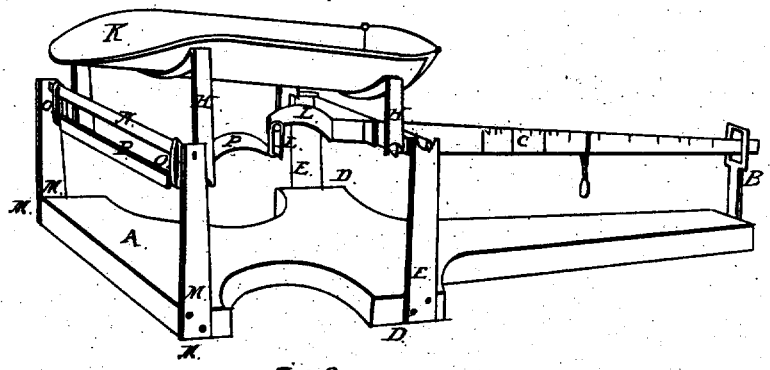
Figure 2:
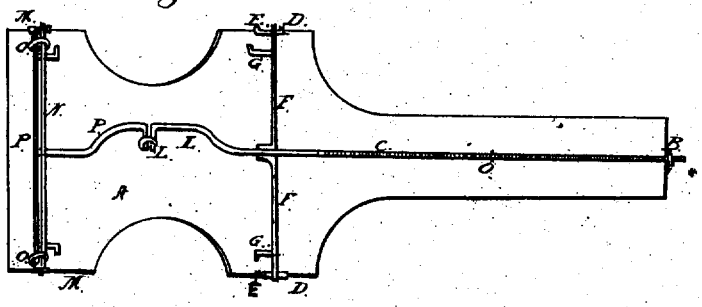

Specimen is not in print.

9231X

E. A. Hibbard.

Balance Scales.

Patented Nov. 7, 1835.

THE NORRIS PETERS CO., WASHINGTON, D. C.

Nov 7, 1835 [illegible]

Elias A. Hibbard, Lunenburg, Vt  9231X
11/7/1835

Letters Patent

The Schedule referred to in these Letters Patent and making part of the
same containing a description in the words of the said Elias A Hibbard
himself of his improvement in Balance for Cemeteries &c.

To all to whom these present shall come Be it known that I Elias A Hibbard
of Lunenburg in the County of Essex and State of Vermont have invented a new and
useful [illegible] Balance and that the following is a full and exact descrip-
tion thereof.

A ground is made [illegible] [illegible] inches in length with five
pillars standing upright to the height of six inches one pillar at one end of
the groundwork has a square mortice in the top in which the [illegible] end
of the beam graduated with notches and figures [illegible] upward and down
ward eighteen inches from this pillar are two projections to the groundwork
turning at right angles and intersecting with two other of the pillars
which pillars are ten inches asunder having a concave half circle
in the top of each to receive two arms extending in opposite points from the end
of the beam other than the one above mentioned and brought to pivot bear
ings where they intersect the circles in the top of the two posts These arms suspend the beam leaving it free at the other
end to move upward down [illegible] one side of each each arm is a projection
of the distance of one and one half inch and turning at right angles
[illegible] the other pivot bearings on which the cricket for the [illegible] rests
[illegible] projection at the intersection of said arms with the beam and
in an opposite direction from that of the beam six inches and then turning
at right angles and brought to a pivot bearing to receive the Centre [illegible]
[illegible] At the other end of the groundwork are two projections simi
lar to the ones above mentioned only the pillars have open [illegible] in the
top instead of circles a cross bar is laid into these [illegible] a pivot bear
[illegible] [illegible] and on which a suspending [illegible] on each Then another Combination of arms and projections, and pivot bearings sim-
-ilar in dimensions to the one above written directed of the beam is sus-
-pended in the two suspending and the centre coupling links then a
cricket with four foot Circular Concave at the lower end of each is set in
the bearings at the right angles of the projections The cricket is Circularly shaped at the
top to receive the tin scoop The weight is obtained by moving the poise on the
graduated beam. The counter balance is composed wholy of iron or some
other hard metal, It is also portable. The scoop is also portable separate from
the balance There are some ancient principles in it such as the tin scoop
the beam graduated with notches and figures &c. which I do not claim as
my invention but what I mean to claim is the general construction of it
but more particularly the system of weight with a scoop and beam without
rods Besides using it to weigh on counters and for family use I design
using a platform in the place of the tin scoop and substitute it for
platform scales in some cases.

Witnesses
George G. Grove
Wm H. Grove

Elias A. Hibbard

[585 words (Drawing Restored.)